(12) United States Patent
Wang et al.

(10) Patent No.: US 7,743,467 B2
(45) Date of Patent: Jun. 29, 2010

(54) HINGE POSITIONING STRUCTURE AND UNIT

(75) Inventors: Jin-Xin Wang, Shenzhen (CN); Ying-Jun Peng, Shenzhen (CN); Jian Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 61 days.

(21) Appl. No.: 11/946,869

(22) Filed: Nov. 29, 2007

(65) Prior Publication Data
US 2009/0089976 A1    Apr. 9, 2009

(30) Foreign Application Priority Data
Oct. 9, 2007    (CN) .................... 2007 1 0201963

(51) Int. Cl.
*E05C 17/64* (2006.01)
(52) U.S. Cl. .................. 16/342; 16/277; 16/281; 16/295; 16/305; 16/319
(58) Field of Classification Search .......... 16/250, 16/255, 256, 257, 277, 281, 285, 286, 291, 16/297, 308, 342, 319, 382, 374, 376, 377
See application file for complete search history.

(56) References Cited

U.S. PATENT DOCUMENTS

| | | | | |
|---|---|---|---|---|
| 5,010,983 A * | 4/1991 | Kitamura | ...................... | 188/67 |
| 5,018,244 A * | 5/1991 | Hino | ........................... | 16/342 |
| 5,197,704 A * | 3/1993 | Kitamura | ............... | 248/292.11 |
| 5,467,504 A * | 11/1995 | Yang | ........................... | 16/342 |
| 5,564,163 A * | 10/1996 | Lowry et al. | .................. | 16/342 |
| 5,771,539 A * | 6/1998 | Wahlstedt et al. | ............. | 16/285 |
| 6,145,797 A * | 11/2000 | Uehara | .................... | 248/291.1 |
| 6,336,252 B1 * | 1/2002 | Bando | ........................ | 16/307 |
| 6,871,383 B2 * | 3/2005 | Huang | ........................ | 16/295 |
| 7,117,562 B2 * | 10/2006 | Zuo et al. | ..................... | 16/303 |
| 2007/0294859 A1 * | 12/2007 | Hsu et al. | ..................... | 16/330 |
| 2008/0092336 A1 * | 4/2008 | Takamori et al. | ............. | 16/319 |
| 2008/0120809 A1 * | 5/2008 | Nakasone | .................... | 16/338 |

* cited by examiner

*Primary Examiner*—Victor Batson
*Assistant Examiner*—Emily M Morgan
(74) *Attorney, Agent, or Firm*—Frank R. Niranjan

(57) ABSTRACT

An exemplary hinge positioning structure (20) includes a base (22), a pivot shaft (24) engaged in the base, a pivot shaft gripper (264), and a resilient member (266). The pivot shaft is rotatably engaged in the base. The pivot shaft gripper is sleeved on the pivot shaft. An end of the pivot shaft gripper is engaged with the base so that part of the pivot shaft gripper is fixed to the base. Two ends of the resilient member are connected to the base and another end of the pivot shaft gripper, respectively. The resilient member applies a force on the pivot shaft gripper so that the pivot shaft gripper tightly grips on the pivot shaft, and the pivot shaft gripper is relaxed by an external force for allowing the pivot shaft to rotate relative to the base. The present invention further provides a hinge positioning unit (26).

7 Claims, 4 Drawing Sheets

HINGE POSITIONING STRUCTURE AND UNIT

BACKGROUND OF THE INVENTION

1. Field of the Invention

The present invention relates generally to hinge positioning structures and units, and particularly to a hinge positioning structure and a hinge positioning unit.

2. Discussion of the Related Art

Hinges are usually used to rotate two elements relative to each other. A force or pressure is applied to one of the two elements to facilitate this relative movement. The two elements are usually able to be stable at any positions without the force or pressure so as to facilitate operating on the elements. Many devices such as notebook computers and clamshell mobile phones have such elements.

A typical hinge used in a device having a liquid crystal display screen includes the following structures: A fixing member for connecting to a main body of the device and a hinge leaf for connecting to the display screen. The fixing member and the hinge leaf are rotatable relative to each other. An elastic member and a plurality of washers are disposed between the fixing member and hinge leaf. An elastic force of the elastic member makes the fixing member, the hinge leaf, and the washers abut to adjacent members. Frictional forces between the members are strong enough to prevent the members from rotating arbitrarily. When a force large enough to overcome the frictional force is imparted on one of the hinge leaf, the hinge leaf can rotate relative to the fixing member.

However, when the frictional force is not strong enough, the hinge leaf is likely to rotate relative to the fixing member without the application of outside forces and may not remain at a desired position. On the other hand, when the frictional force is too strong, the hinge leaf may rotate only on applying an inordinate amount of force. In addition, when the hinge is used for a certain time, the frictional force may become smaller because of deformation of the elastic member, abrasion of the washers, or other reasons, thus the hinge cannot work.

Therefore, a new hinge positioning structure and unit which solve the above-described problems are desired.

SUMMARY

An exemplary hinge positioning structure includes a base, a pivot shaft engaged in the base, a pivot shaft gripper, and a resilient member. The pivot shaft is rotatably engaged in the base. The pivot shaft gripper is sleeved on the pivot shaft. An end of the pivot shaft gripper is engaged with the base so that part of the pivot shaft gripper is fixed relative to the base. Two ends of the resilient member are connected to the base and another end of the pivot shaft gripper, respectively. The resilient member applies a force on the pivot shaft gripper so that the pivot shaft gripper tightly grips on the pivot shaft, such that the pivot shaft is prevented from rotating relative to the base. The pivot shaft gripper is relaxed by an external force for allowing the pivot shaft to rotate relative to the base.

An exemplary hinge positioning unit includes a pivot shaft and an pivot shaft gripper. The pivot shaft gripper is sleeved on the pivot shaft. The pivot shaft gripper has a first end and a second end. The pivot shaft gripper is tightly sleeved or relaxed sleeved on the pivot shaft by pulling or relaxing the first and second ends, thus locking or unlocking the pivot shaft.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present hinge positioning structure and unit. Moreover, in the drawings, like reference numerals designate corresponding parts throughout the several views, and all the views are schematic.

DETAILED DESCRIPTION OF THE EMBODIMENTS

Figure 1:
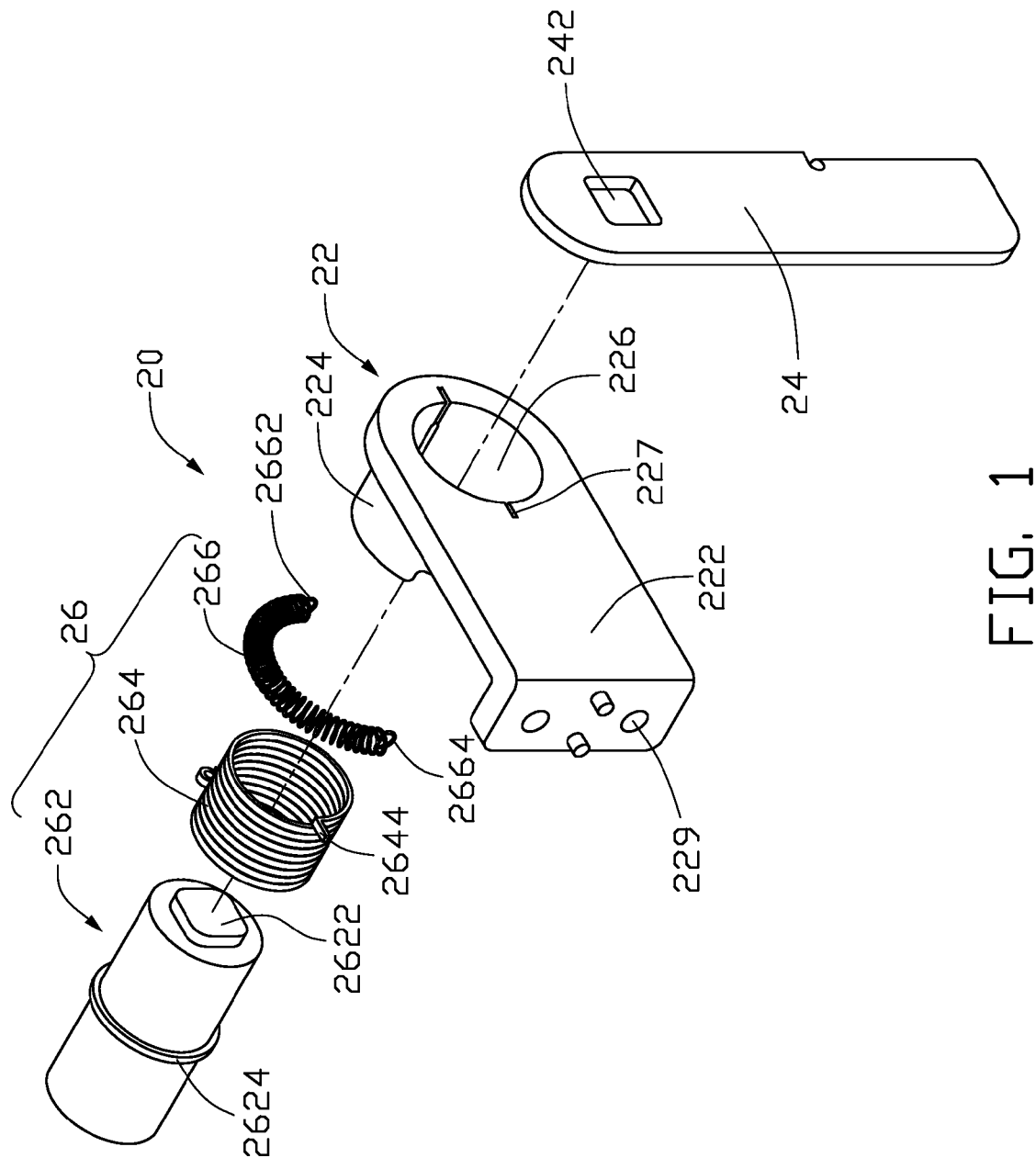
FIG. 1 is an exploded, isometric view of a hinge positioning structure of an embodiment of the present invention viewed from a first direction.
Figure 2:
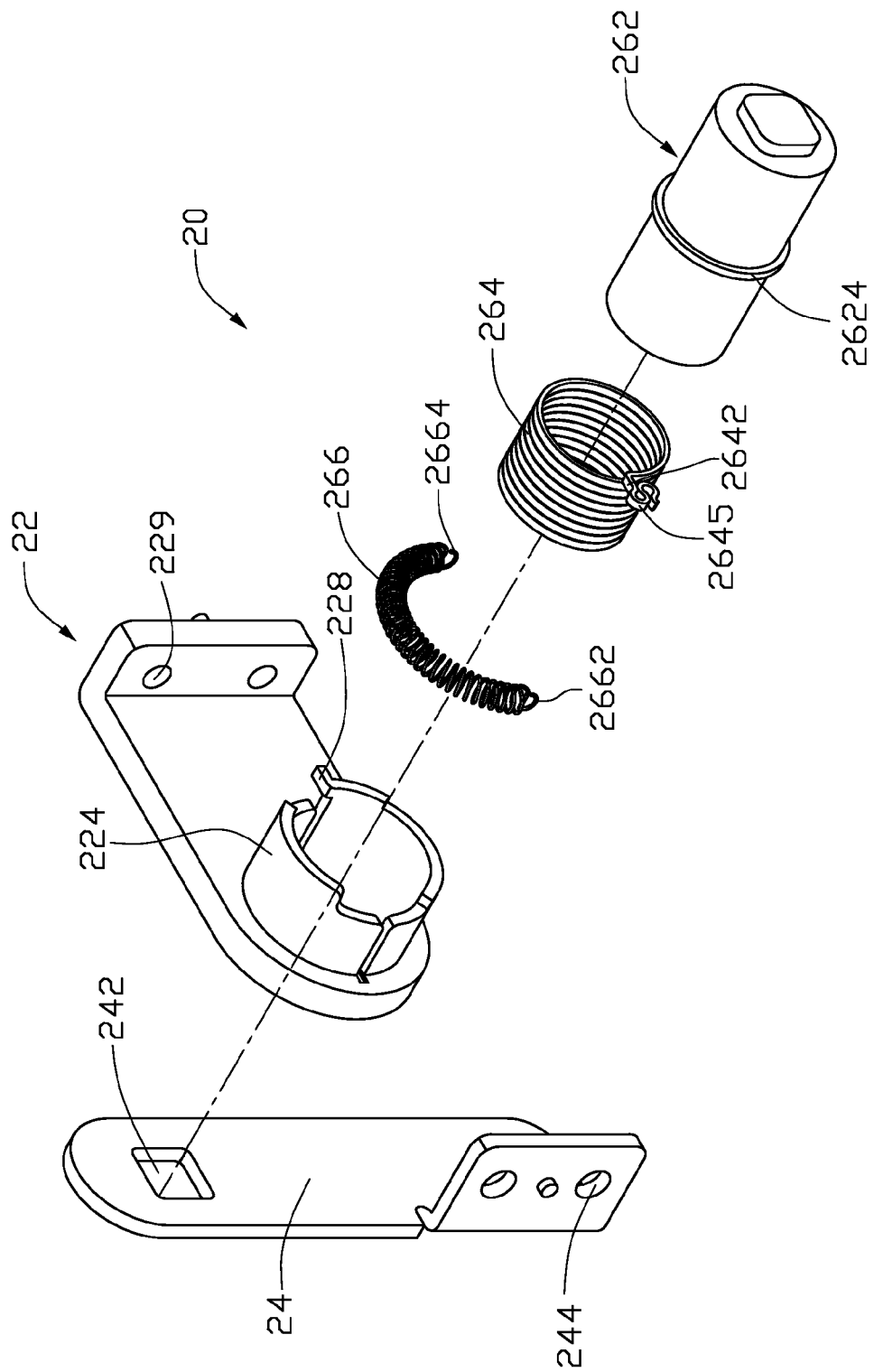
FIG. 2 is an exploded, isometric view of the hinge positioning structure of FIG. 1 viewed from a second direction.

Referring to FIG. 1 and FIG. 2, a hinge positioning structure 20 of an embodiment includes a base 22, a first hinge leaf 24, and a hinge positioning unit 26.

The base 22 includes a second hinge leaf 222 and a node portion 224. The second hinge leaf 222 is substantially a flat sheet. The node portion 224 is substantially a hollow cylinder and an end of the node portion 224 is perpendicularly connected to the second hinge leaf 222. That is, the node portion 224 perpendicularly extends out of the second hinge leaf 222. A circular pivot hole 226 is defined in the base 22 and extends through the node portion 224 and the second hinge leaf 222. A positioning groove 227 is defined in an inner sidewall of the node portion 224 and extends along a direction perpendicular to the second hinge leaf 222. A protrusion 228 (shown in FIG. 2) extends out from an end of the node portion 224 away from the second hinge leaf 222.

The first hinge leaf 24 is a sheet defining a non-circular engaging hole 242 at an end of the first hinge leaf 24.

The hinge positioning unit 26 includes a pivot shaft 262, a pivot shaft gripper 264, and a resilient member 266.

The pivot shaft 262 is approximately cylindrical. The pivot shaft 262 has a non-circular engaging protrusion 2622 extending from an end. A size and a shape of the engaging protrusion 2622 correspond to the engaging hole 242 of the first hinge leaf 24. The engaging protrusion 2622 is engaged in the engaging hole 242 such that the first hinge leaf 24 is non-rotatable relative to the pivot shaft 262. A ring-shaped rib 2624 is formed around a cylindrical surface of the pivot shaft 262.

The pivot shaft gripper 264 is a columnar, helical, torsional spring including a plurality of spring rings (not labeled). The pivot shaft gripper 264 further includes a first end 2642 and a second end 2644. The first and second ends 2642, 2644 extend at distal ends of the pivot shaft gripper 264 respectively. An S-shaped hook 2645 is formed at the first end 2642. The pivot shaft gripper 264 is sleeved on the pivot shaft 262 with the spring rings sleeved on the pivot shaft 262. A cross-sectional of the pivot shaft gripper 264 is substantially rectangular.

The resilient member 266 is an extension/compression spring that can be extended and compressed. The resilient member 266 includes a first ring 2662 and a second ring 2664 formed at distal ends. The first ring 2662 of the resilient member 266 is configured to be connected to the first end 2642 of the pivot shaft gripper 264 and the second ring 2664 of the resilient member 266 is configured to wrap around the protrusion 228 of the base 22. In other words, the resilient member 266 pulls the pivot shaft gripper 264 to constrict.

Figure 3:
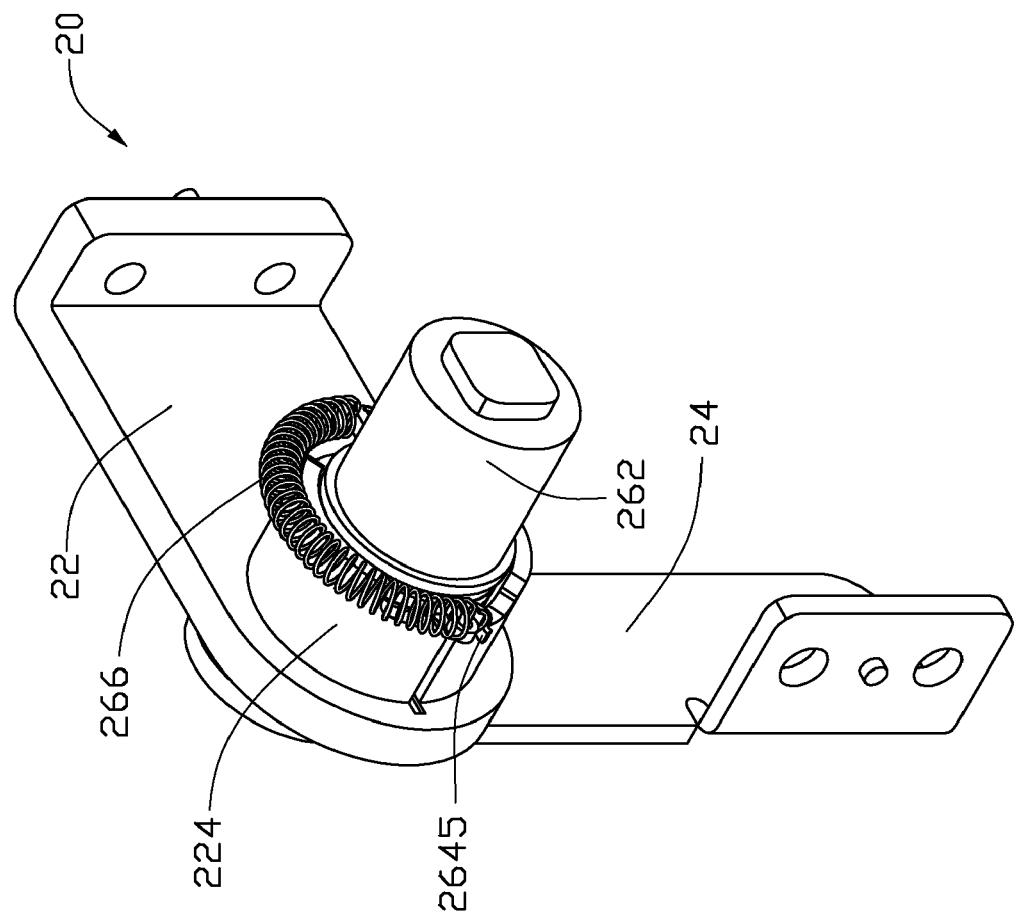
FIG. 3 is an assembled, isometric view of the hinge positioning structure of FIG. 1.
Figure 4:
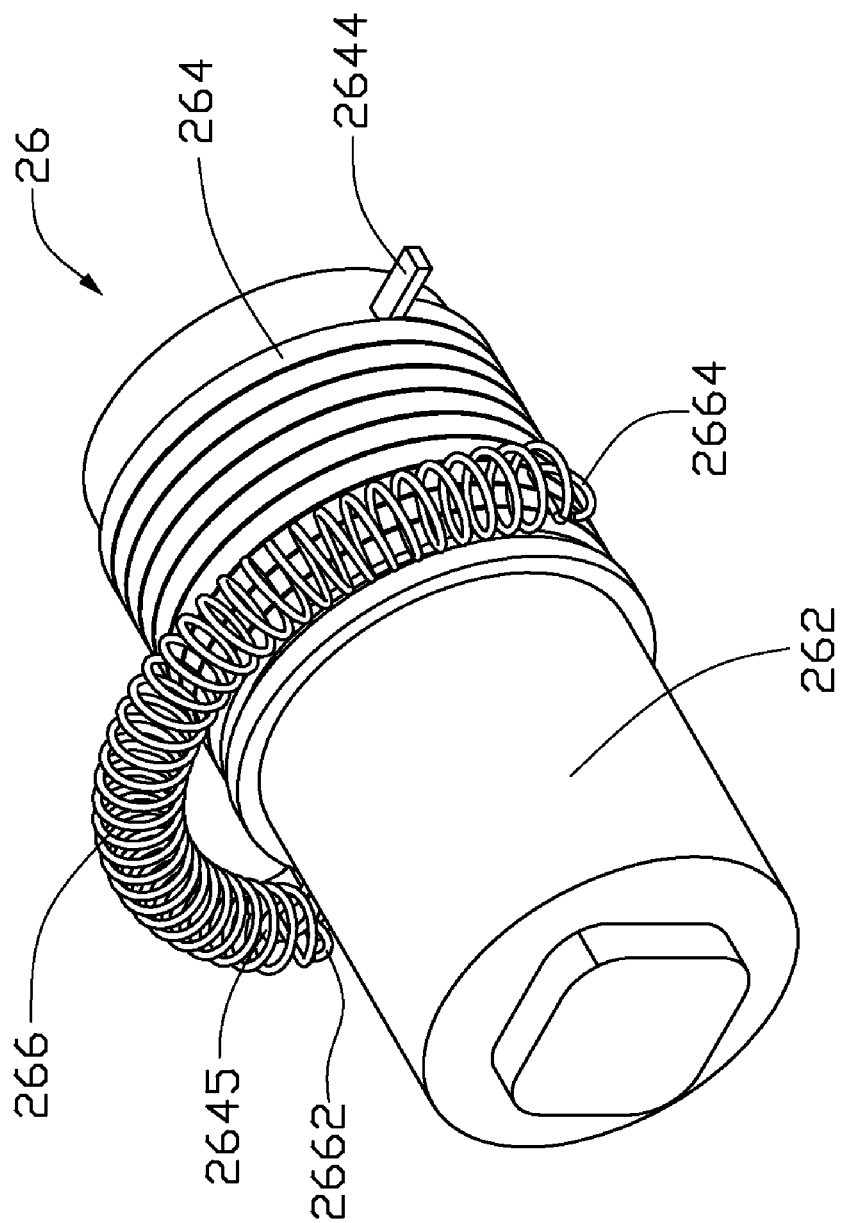
FIG. 4 is an assembled, isometric view of a hinge positioning unit of an embodiment of the present invention.

Referring to FIG. 3 and FIG. 4, in assembling the hinge positioning structure 20, the pivot shaft gripper 264 is sleeved on the pivot shaft 262. Then the pivot shaft 262 together with the pivot shaft gripper 264 is inserted into the pivot hole 226 of the base 22. The second end 2644 of the pivot shaft gripper 264 is inserted into the positioning groove 227 of the base 22 such that the second end 2644 is non-rotatable relative to the base 22, while the pivot shaft 262 is rotatable relative to the base 22. The engaging protrusion 2622 of the pivot shaft 262 is inserted into the engaging hole 242 of the first hinge leaf 24 such that the pivot shaft 262 is fixed to the first hinge leaf 24. The first ring 2662 of the resilient member 266 is attached/hooked to the hook 2645 of pivot shaft gripper 264. The second ring 2664 of the resilient member 266 wraps around the protrusion 228 of the base 22.

At rest, the resilient member 266 pulls the pivot shaft gripper 264 to constrict. Thus, the pivot shaft gripper 264 tightly grips on the pivot shaft 262 such that the pivot shaft 262 is non-rotatable in the pivot shaft gripper 264. Meanwhile, the first and second ends 2642, 2644 of the pivot shaft gripper 264 are fixed relative to the base 22. Therefore, the first hinge leaf 24 together with the pivot shaft 262 cannot rotate relative to the base 22 thus fixing a positioning of the hinge positioning structure 20.

When the hinge positioning structure 20 is to be rotated, an external force is applied at the first ring 2662 and the first end 2642 connection to further extend the resilient member 266 and subsequently relaxing the constriction of the pivot shaft gripper 264. When the first hinge leaf 24 rotates to a desired position, the external force is released, and the pivot shaft gripper 264 re-constricts around the pivot shaft 262. Therefore, the pivot shaft gripper 264 tightly grips on the pivot shaft 262 and the first hinge leaf 24 cannot rotate relative to the base 22 thus carrying out a brake function again.

In alternative embodiment, for facilitating to apply the external force, the hinge positioning structure 20 may further include a lever (not shown). One end of the lever is connected to the first ring 2662 of the resilient member 266 or the first end 2642 of the pivot shaft gripper 264, another end of the lever extends out of a device what the hinge positioning structure 20 is applied to. Thus, the external force can be applied on the pivot shaft gripper 264 by pulling the lever.

When the pivot shaft 262 is braked by the pivot shaft gripper 264, the first hinge leaf 24 together with the pivot shaft 262 is unable to be rotated without damaging the members of the hinge positioning structure 20. Therefore, the first hinge leaf 24 and the pivot shaft 262 can remain at any positions stably. When a force is applied to loosen the constriction of the pivot shaft gripper 264, the first hinge leaf 24 can be rotated easily.

In alternative embodiments, the pivot shaft 262 and the first hinge leaf 24 can be designed to be an integral unit. The pivot shaft gripper 264 may be replaced by other pivot shaft grippers for providing a torsion force. The hinge positioning structure 20 can be applied to devices such as liquid crystal display devices. The base 22 is coupled to a main body of the liquid crystal display device via a plurality of assembling holes 229, and the first hinge leaf 24 is coupled to a screen of the liquid crystal display device via a plurality of assembling holes 244.

In an alternative embodiment, the hinge positioning unit 26 as a whole unit can be used by itself. In this embodiment, the pivot shaft gripper 264 is sleeved on the pivot shaft 262. Two ends of the resilient member 266 are fixedly coupled to two ends of the pivot shaft gripper 264 such that the pivot shaft gripper 264 tightly grips on the pivot shaft 262. Therefore, the pivot shaft 262 is unable to rotate. When an external force is applied to pull the resilient member 266 to relax the pivot shaft gripper 264, the pivot shaft 262 is able to rotate. The resilient member 266 can be omitted. With the condition, the external force is applied on two ends of the pivot shaft gripper 264. When a diameter of spring rings of the pivot shaft gripper 264 is larger than that of the pivot shaft 262, the pivot shaft gripper 264 can be pulled to tightly sleeved on the pivot shaft 262, and the pivot shaft gripper 264 is relaxed sleeved on the pivot shaft 262 by removing the external force. When a diameter of spring rings of the pivot shaft gripper 264 is smaller than that of the pivot shaft 262, the pivot shaft gripper 264 can be pulled to be relaxed on the pivot shaft 262, and the pivot shaft gripper 264 tightly sleeved on the pivot shaft 262 by removing the external force.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A hinge positioning structure comprising:
    a base defining a positioning groove and forming a protrusion;
    a pivot shaft rotatably engaged in the base;
    a pivot shaft gripper sleeved on the pivot shaft, an end of the pivot shaft gripper engaged with the base so that part of the pivot shaft gripper is fixed relative to the base, the pivot shaft gripper comprising a first end and a second end, the second end of the pivot shaft gripper engaged in the positioning groove of the base such that the second end is non-rotatable relative to the base, the pivot shaft gripper forming a hook at a distal end of the first end; and
    a resilient member comprising a first ring and a second ring formed at two distal ends thereof, the first and second rings of the resilient member engage with the hook of the pivot shaft gripper and the protrusion of the base respectively, two ends of the resilient member connected to the base and another end of the pivot shaft gripper, respectively, the resilient member applying a force on the pivot shaft gripper so that the pivot shaft gripper tightly grips on the pivot shaft, such that the pivot shaft is incapable of rotating in a predetermined direction relative to the base, and the pivot shaft gripper being relaxed by an external force for allowing the pivot shaft to rotate relative to the base.

2. The hinge positioning structure as claimed in claim 1 further comprising a first hinge leaf, the first hinge leaf being fixed relative to the pivot shaft.

3. The hinge positioning structure as claimed in claim 2, wherein the first hinge leaf is a sheet defining an engaging hole, the pivot shaft has an engaging protrusion formed at one end thereof, a size and a shape of the engaging protrusion are corresponding to that of the engaging hole of the first hinge leaf, the engaging protrusion is engaged in the engaging hole such that the first hinge leaf is non-rotatable relative to the pivot shaft.

4. The hinge positioning structure as claimed in claim 1, wherein the pivot shaft gripper is a columnar, helical, torsional spring, the first and second ends are disposed at two distal ends of the pivot shaft gripper.

5. The hinge positioning structure as claimed in claim 1, wherein the base comprises a second hinge leaf and a node portion, the second hinge leaf is substantially a flat sheet, the node portion is substantially a hollow cylinder, the node portion is perpendicularly connected to the second hinge leaf, a circular pivot hole is defined in the base and extends through the node portion and the second hinge leaf, the pivot shaft sleeved with the pivot shaft gripper is rotatably engaged in the pivot hole of the base.

6. The hinge positioning structure as claimed in claim 5, wherein the positioning groove is defined in an inner sidewall defining the pivot hole, the protrusion extends out from an end of the node portion away from the second hinge leaf.

7. The hinge positioning structure as claimed in claim 1, wherein the resilient member is an extension/compression spring that can be extended and compressed.

\* \* \* \* \*